May 27, 1969  J. F. MAYER  3,446,508
DEFORMABLE SEALING RING HAVING INTEGRAL SPACER FLANGE
Filed June 20, 1966

INVENTOR.
JOHN F. MAYER
BY Howard A. Silber
ATTORNEY

United States Patent Office 3,446,508
Patented May 27, 1969

3,446,508
DEFORMABLE SEALING RING HAVING INTEGRAL SPACER FLANGE
John F. Mayer, El Segundo, Calif., assignor to Navan Incorporated
Filed June 20, 1966, Ser. No. 558,795
Int. Cl. F16j 15/00; B65d 53/00; F16l 19/02
U.S. Cl. 277—180    4 Claims

ABSTRACT OF THE DISCLOSURE

A high pressure sealing ring, adapted for use in joining a pair of fluid conducting members, and comprising a substantially cylindrical body having an integral flange extending radially outward from the body. A circumferential groove in the flange permits the body to be deformed flexibly with respect to the flange when the lower curved portion of the body is forced against a conical camming surface on one of the members to be joined. This deformation forms line contact seals between the body and the members being joined. The flange provides a secondary seal and also prevents excessive stress on the sealing body.

---

The present invention relates to an improved seal adapted for use in joining a pair of fluid conducting members and more particularly to a high pressure seal between a fitting and associated boss.

The prior art is replete with various proposals for sealing fluid conducting members. However, such devices and arrangements for sealing joints have generally failed to alleviate the problems of eccentric or off-center loading conditions on the seal, excessive hoop stresses at high temperatures, radial shrinkage of the seal during the initial sealing, shift in sealing edge to different locations, and increase in size causing a low unit loading and leakage. These disadvantages are substantially eliminated by the seal of the present invention.

The present invention is an improved seal of the type described in U.S. Patent No. 3,106,413 and has the advantage of a planar top surface normal to the center line with a sealing surface forming a sharp edge on the top and employing a spherical-like sealing surface on the bottom which cooperate with the boss to deform the seal to form the sealing edge.

It is the primary object of the present invention to provide a seal which is easier to install, has improved sealing performance and greater reliability under high pressure and extreme temperature conditions when exposed to a high vibration environment.

Another object of the present invention is to provide a high performance seal for use as a union seal, integral stop bulkhead seal, or integral stop union dual seal.

Another object of the present invention is to provide an improved fitting seal arrangement employing a spherical surface cooperating with a conical seal contacting surface to provide improved seal performance.

These and other objects of the present invention will be more apparent from the following detailed description and drawings wherein.

Figure 1:
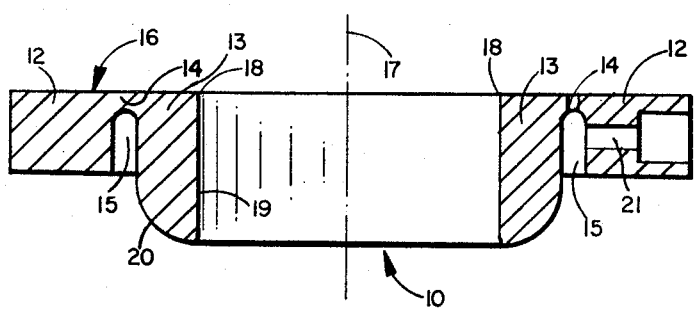
FIG. 1 is a cross-sectional view of an integral stop union seal of the present invetion.

Referring to the drawings in detail, FIG. 1 shows a sealing ring 10 for the integral stop union seal having a peripheral, integral spacer flange 12. The spacer flange 12 is connected to the cylindrical body portion 13 by a flexure portion 14, the latter being formed by a circumferential groove or slot 15 between the cylindrical body 13 and the integral spacer flange 12. The top surface 16 of the seal element 10 is flat and normal to the center line 17 of the element. The cylindrical body 13 has an aperture which forms a sharp sealing edge 18 at the junction between surface 16 and the inside diameter surface 19 of the cylindrical body portion 13. The outer bottom surface 20 of the cylindrical body portion 13 has a spherical or approximately spherical surface. Also shown in FIG. 1 are the optional features of a monitoring aperture 21 in the flexure portion 14 to monitor or trap leakage from the primary seal.

Figure 2:
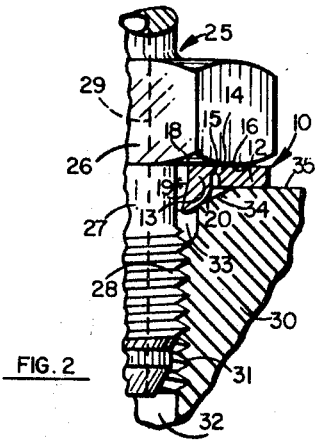
FIG. 2 is a partially cross-sectioned view of the seal of FIG. 1 in final sealing position.

FIG. 2 shows the seal of FIG. 1 in final sealing position with a union fitting 25 having a hex portion 26, a neck portion 27, a threaded portion 28, and a central cylindrical aperture 29. The fitting 25 is mated to a body 30 having a female threaded portion 31, a bore 32, a counterbored portion 33, a conical camming surface 34 connecting the upper surfaces 35 of the body 30 and the counterbore 33. The sealing ring 10 is shown in its flexed sealing position between the bottom surface of hex portion 26 and the top surface 35 of body 30 and conical surface 34.

Under the sealing conditions as shown in FIG. 2, the integral spacer or washer flange 12 is fabricated to a preselected dimension, so that when the union 25 is tightened down in the boss to a predetermined dimension the union will bottom out on the spacer 12 and tighten down no further. In this manner overloading the seal is prevented and allows the seal to be designed to a closer range of operation. This feature also tends to square up the fitting with respect to the boss. The spacer 12 also provides a support ring which will prevent excessive hoop stresses at high pressure and prevents the radial growth of the seal when it is squeezed and deflected or flexed by the fitting.

The flexure portion 14 acts as a hinge or flexible joint between the cylindrical body 13 and the spacer ring 12 and allows the seal to rotate in section as it is loaded by force applied through the fitting. The flexure portion 14 also functions as a radial support member between the outside diameter of the seal and the inside diameter of the spacer 12. In the embodiment of FIG. 1 the flexure or reduced thickness part 14 is located in the top surface although it may be located in the bottom surface (see FIG. 5). In both of these embodiments of the flexure the slot 15 is circumferential and parallel to the central axis 17 of the seal element 10.

The upper surface 16 of the seal element 10 plays an integral part in the sealing operation. This surface which is easy to fabricate and to inspect, becomes a conical surface after the seal is loaded and starts to rotate in section, as shown in FIG. 2. The greater the load applied to the seal the more conical it becomes. Thus, the sharp corner 18 is always the sealing edge and no significant change takes place in its size or location as the seal is loaded.

The bottom surface or nose end 20 of the seal 10 is curved to form an approximately spherical surface. This surface 20 mates with conical camming surface 34 to cause a flexing of flexure 14 and a distortion of the cylindrical portion 13. This distortion results in the sharp corner 18 forming a seal on the bottom surface of the hex portion 26 of union 25. The mismatch between the spherical surface 20 and conical surface 34 results in the formation of a line contact seal. This line contact is important because the unit loading is high and therefore seal performance is better and, because the line contact is maintained, no leakage results even if there are angular differences between the axis of the conical seat 34 and the axis of the fitting 25.

The flat surface 16 of the spacer 12 acts as a secondary seal for dual sealing applications. As a result of the forces generated by the fitting squeezing the spacer 12 against the surface 35, a highly effective gasket type secondary seal is achieved at this opsition. In many applications it is desirable to cover the surfaces of the sealing element 10 with some soft sealing material, either plastic or metallic. However, the base metal may be relied upon to achieve proper sealings in applications with the more viscous fluids.

Figure 3:
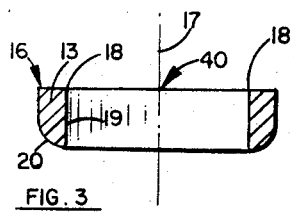
FIG. 3 is a cross-sectional view of another embodiment of the present invention.
Figure 4:
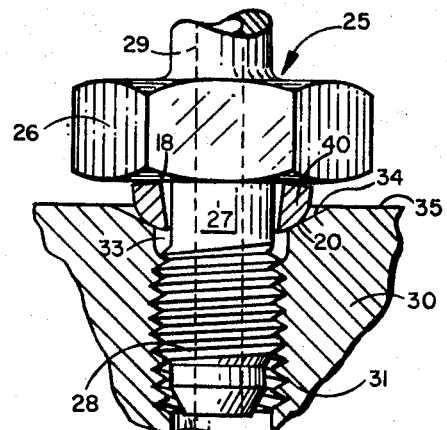
FIG. 4 is a partially cross-sectioned view of the seal of FIG. 3 in final sealing position.

FIG. 3 shows another embodiment of the present invention. In this embodiment the seal element 40 is identical with that of FIG. 1, except that the sealing ring portion 12 and flexures 14 have been eliminated. The sealing operation of this sealing element 40 is shown in FIG. 4. Here, as in FIG. 2, the cooperative action of the spherical surface 20 and conical camming surface 34 cause a twisting of the cylindrical portion 13. This twisting results in the sharp corner 18 forming a line contact seal with the bottom surface of the hex portion 26 of the union 25 while a similar line contact seal is made between surfaces 20 and 34. No secondary sealing is accomplished on the surface 35 in this embodiment. It should also be noted that when the inner cylindrical surface 19 is exposed to high pressure, the particular arrangement of line contact seals formed by the element 40 with surface 16 and the bottom surface of 26 increases the load on the line contact seals thereby improving the seal performance.

Figure 5:
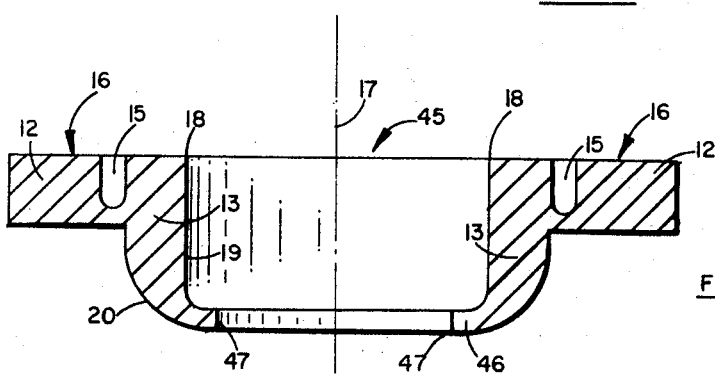
FIG. 5 is a cross-sectional view of the integral stop bulkhead type seal of the present invention.
Figure 6:
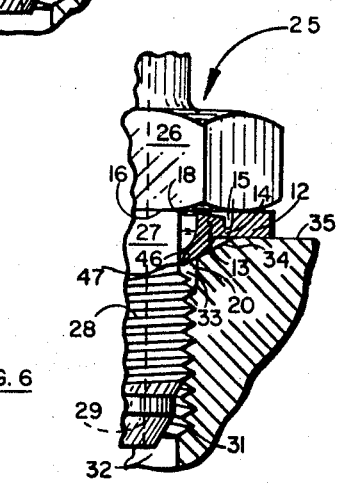
FIG. 6 is a partially cross-sectioned view of the seal of FIG. 5 in final sealing position.

FIG. 5 shows another embodiment of the present invention similar to the embodiment of FIG. 1 which functions in much the same manner. In addition, this embodiment includes a projection 46 formed by the inward extension of surface 20 and the inward projection of the cylindrical portion 13. The circumferentially inwardly extending projection 46 provides a sharp edge 47 which bites into the stem or neck portion of the fitting to form a secondary seal around such a neck portion.

While the embodiments of the present invention described above and illustrated in the drawings utilize sealing elements having cylindrical portions 13 with inside diameter larger than the threaded portion 28 of the associated fitting, it is within the purview of the invention to preswage the seal onto the fitting.

Seals fabricated in accordance with the present invention have been tested under such adverse conditions as −320° F. under 2,000 p.s.i. helium pressure, and 1,220° F. under 1,800 p.s.i. helium pressure without detectable leakage. While a wide variety of materials may be utilized in fabricating the seals and associated fittings, stainless steel is the preferred material because of its high temperature and pressure characteristics and resistance to corrosion.

Although specific embodiments of the invention have been described and illustrated in detail, it is understood that these embodiments are exemplary only and do not limit the invention, the spirit and scope being limited only by the claims.

I claim:
1. A static seal combination comprising a body having an aperture therein, a conical camming surface formed around said aperture in the upper surface of said body, a fitting member inserted into said aperture, said member having an axially extending neck portion fixedly connected to a sealing surface generally parallel to the upper surface of said body, a sealing ring positionable between said sealing surface and said camming surface and around said neck portion, said sealing ring comprising a substantially cylindrical body portion and a flange portion extending radially outwardly of, and flexibly integrally connected to, said body portion, said sealing ring body and flange portions having a common flat top surface forming a sharp corner with the internal cylindrical aperture of said body portion, the outer surface of said body portion on the end thereof opposite said sharp corner having a rounded camming and sealing surface, said rounded camming surface engaging said conical camming surface when said fitting member is moved into said body aperture to distort said body portion forcing said sharp corner into said sealing surface to form a line contact seal, said rounded and conical camming surfaces forming another line contact seal between said ring and said body, said flange portion forming a secondary seal along said upper body surface and said sealing surface of said fitting member and limiting the amount of force applied to said ring.

2. The static seal combination of claim 1, wherein said flange portion comprises a circumferential groove adjacent said cylindrical body of said ring so that upon engagement of said conical camming surface said cylindrical body is rotated slightly relative to said flange.

3. The static seal combination of claim 1, wherein said sealing ring includes a circumferential groove between said flange portion and said cylindrical body portion, said flange portion having a second sealing surface parallel with said first flat sealing surface and positioned on the opposite side of said flange portion.

4. The static seal combination of claim 3, wherein said groove is parallel to said axially extending cylindrical body portion and normal to said flat sealing surfaces.

References Cited

UNITED STATES PATENTS

| 999,169 | 7/1911 | Jones | 277—212 X |
| 1,313,202 | 8/1919 | Mustor | 277—212 X |
| 2,489,769 | 11/1949 | Flick | 277—212 X |
| 3,003,795 | 10/1961 | Lyon. | |
| 3,159,302 | 12/1964 | Latham et al. | 277—236 X |

FOREIGN PATENTS

| 956,426 | 4/1964 | Great Britain. |

LAVERNE D. GEIGER, *Primary Examiner.*

JEFFREY S. MEDNICK, *Assistant Examiner.*

U.S. Cl. X.R.

277—212, 236